A. STRECKER.
GAS AND OTHER PIPES.

No. 177,586. Patented May 16, 1876.

UNITED STATES PATENT OFFICE.

ALEXANDER STRECKER, OF NEW YORK, N. Y.

IMPROVEMENT IN GAS AND OTHER PIPES.

Specification forming part of Letters Patent No. 177,586, dated May 16, 1876; application filed April 6, 1876.

*To all whom it may concern:*

Be it known that I, ALEXANDER STRECKER, of the city of New York, and State of New York, have invented a new and useful Improvement in Gas and other Pipes, which improvement is fully set forth in the following specification, reference being had to the accompanying drawing, in which—

Figure 1:
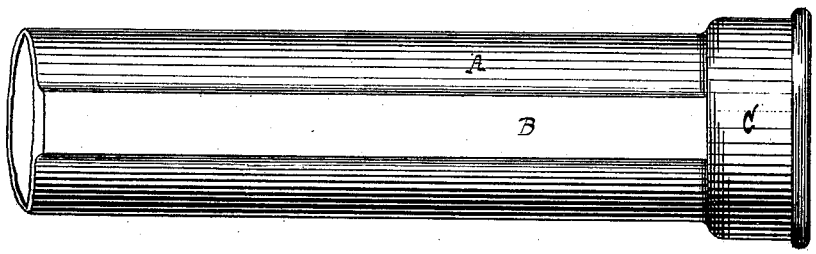
Figure 2:
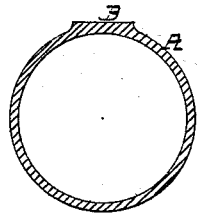

Figure 1 represents a top view of my improved pipe; and Fig. 2, a cross-section.

Similar letters indicate corresponding parts.

The object of my invention is to construct metallic pipes, such for instance, as gas-pipes, and other pipes of cast metal, of the necessary strength and thickness along one side where it may become necessary to insert branch pipes, so that such branch-pipes will have the required support in the openings tapped for them in the main pipe without any necessity of resorting to other provisions for providing the required support.

In carrying out my invention I cast a web on one side of the pipe, which will be the upper or accessible side of the pipe, so as thereby to provide in the pipe itself, when it is laid, a continuous line, suitable to be tapped to receive branch pipes or other connections, so that the pipe itself shall be of the desired thickness and strength to receive a screw-thread of proper length on one side, while other sides or portions of its circumference are made only of such thickness and strength as are necessary to resist the pressure of the contents to endure the usual wear. The exterior surface of the web is preferably made flat for the purpose of obtaining a square joint between it and the branch or connecting pipe on the outside of the web.

The letter A designates a section of a pipe to which I have applied my invention. B is a web extending from the head C of the pipe nearly to the end of the section. The web is cast with the pipe, and in laying pipes which contain my invention they are so placed that the web will be on the upper side or exposed side which is to receive a joint or branch pipe. For pipes of four or six inches diameter I make the web B about two inches wide, and for pipes of ten, twelve, and twenty inches diameter, I make the web about two and a half inches in width; but I do not limit my invention to any specific width of the web, as a web of less width than the diameter of the branch pipes will afford an increased depth and bearing on the two opposite sides of the branch pipe.

What I claim as new, and desire to secure by Letters Patent, is—

The web B cast along one side of gas or other metal pipes to form bearings for branch or other connecting pipes, substantially as described.

In testimony that I claim the foregoing I have hereunto set my hand this 29th day of March, 1876.

ALEXANDER STRECKER.

Witnesses:
M. CAFLISCH,
O. G. REAGAN.